(12) United States Patent
Miller et al.

(10) Patent No.: US 10,480,806 B2
(45) Date of Patent: *Nov. 19, 2019

(54) ENERGY REDUCING RETROFIT APPARATUS FOR A CONSTANT VOLUME HVAC SYSTEM

(71) Applicant: Transformative Wave Technologies LLC, Kent, WA (US)

(72) Inventors: Danny Miller, Renton, WA (US); Justin Sipe, Federal Way, WA (US)

(73) Assignee: Transformative Wave Technologies LLC, Kent, WA (US)

( * ) Notice: Subject to any disclaimer, the term of this patent is extended or adjusted under 35 U.S.C. 154(b) by 81 days.

This patent is subject to a terminal disclaimer.

(21) Appl. No.: 15/899,916

(22) Filed: Feb. 20, 2018

(65) Prior Publication Data

US 2018/0172306 A1    Jun. 21, 2018

Related U.S. Application Data

(60) Continuation of application No. 14/689,344, filed on Apr. 17, 2015, now Pat. No. 9,933,178, which is a
(Continued)

(51) Int. Cl.
*F24F 11/00* (2018.01)
*F24F 11/30* (2018.01)
(Continued)

(52) U.S. Cl.
CPC ............. *F24F 11/30* (2018.01); *F24F 11/46* (2018.01); *F24F 11/62* (2018.01); *F24F 11/77* (2018.01);
(Continued)

(58) Field of Classification Search
None
See application file for complete search history.

(56) References Cited

U.S. PATENT DOCUMENTS 4,205,381 A    5/1980    Games et al.
4,362,026 A    12/1982    Miller
(Continued)

FOREIGN PATENT DOCUMENTS

EP    1557618 A2    7/2005
WO    WO-2004048858 A1    6/2004
(Continued)

OTHER PUBLICATIONS

AAON Single Zone VAV Discover how to save money, reduce energy consumption and lower sound levels (2010).
(Continued)

*Primary Examiner* — Jennifer L Norton
(74) *Attorney, Agent, or Firm* — Harness, Dickey & Pierce, P.L.C.

(57) ABSTRACT

An energy-reducing method and apparatus for retrofitting a single zone, constant volume HVAC system, with or without an economizer, that provides heating, cooling, and ventilation to occupants within a building space. The present invention includes the introduction of a programmable logic controller and variable frequency drive (VFD) that takes control of the existing fan, heating, cooling, and optional economizer operation. The reduction of the fan speed in the ventilation mode when the 100% operation is not needed saves significant energy of the existing constant volume HVAC system where the fan motor is designed to run 100% of the time.

6 Claims, 16 Drawing Sheets

Retrofit w/Occupancy Sensor

Related U.S. Application Data division of application No. 14/563,941, filed on Dec. 8, 2014, now Pat. No. 9,043,034, which is a continuation of application No. 13/920,331, filed on Jun. 18, 2013, now Pat. No. 8,965,586, which is a continuation of application No. 12/544,960, filed on Aug. 20, 2009, now Pat. No. 8,515,584.

(51) Int. Cl.
| | | |
|---|---|---|
| F24F 11/46 | (2018.01) | |
| F24F 11/62 | (2018.01) | |
| F24F 11/77 | (2018.01) | |
| G05B 19/042 | (2006.01) | |
| G05B 19/05 | (2006.01) | |
| G05D 23/19 | (2006.01) | |
| G05D 7/06 | (2006.01) | |
| H04L 29/08 | (2006.01) | |
| F24F 110/20 | (2018.01) | |
| F24F 110/50 | (2018.01) | |
| F24F 110/70 | (2018.01) | |

(52) U.S. Cl.
CPC .......... *G05B 19/042* (2013.01); *G05B 19/05* (2013.01); *G05D 7/0676* (2013.01); *G05D 23/1919* (2013.01); *H04L 67/12* (2013.01); *H04L 67/125* (2013.01); *F24F 2011/0006* (2013.01); *F24F 2110/20* (2018.01); *F24F 2110/50* (2018.01); *F24F 2110/70* (2018.01); *G05B 2219/1133* (2013.01); *G05B 2219/25289* (2013.01); *G05B 2219/2614* (2013.01); *Y02B 30/542* (2013.01); *Y02B 30/746* (2013.01); *Y02B 30/78* (2013.01); *Y02B 30/94* (2013.01)

(56) References Cited

U.S. PATENT DOCUMENTS

| | | | |
|---|---|---|---|
| 4,519,539 A | 5/1985 | Bussjager et al. | |
| 4,530,395 A | 7/1985 | Parker et al. | |
| 4,843,084 A | 6/1989 | Parker et al. | |
| 4,884,214 A | 11/1989 | Parker et al. | |
| 5,261,481 A | 11/1993 | Baldwin et al. | |
| 5,544,809 A | 8/1996 | Keating et al. | |
| 5,931,227 A | 8/1999 | Graves | |
| 5,971,067 A | 10/1999 | Rayburn et al. | |
| 6,161,764 A | 12/2000 | Jatnieks | |
| 6,179,213 B1 | 1/2001 | Gibino et al. | |
| 6,196,468 B1 | 3/2001 | Young | |
| 6,491,094 B2 | 12/2002 | Rayburn et al. | |
| 6,508,303 B1 | 1/2003 | Naderer | |
| 6,629,886 B1 | 10/2003 | Estepp | |
| 6,698,219 B2 | 3/2004 | Sekhar et al. | |
| 6,792,767 B1 | 9/2004 | Pargeter et al. | |
| 6,916,239 B2 | 7/2005 | Siddaramanna et al. | |
| 6,919,809 B2 | 7/2005 | Blunn et al. | |
| 6,994,620 B2 | 2/2006 | Mills | |
| 7,055,759 B2 | 6/2006 | Wacker et al. | |
| 7,086,240 B1 | 8/2006 | Zugibe et al. | |
| 7,130,719 B2 | 10/2006 | Ehlers et al. | |
| 7,216,015 B2 | 5/2007 | Poth | |
| 7,377,450 B2 | 5/2008 | Van Ostrand et al. | |
| 7,434,413 B2 | 10/2008 | Wruck | |
| 7,510,126 B2 | 3/2009 | Rossi et al. | |
| 7,516,044 B2 | 4/2009 | Engle | |
| 7,918,407 B2 | 4/2011 | Patch | |
| 8,027,742 B2 | 9/2011 | Seem et al. | |
| 8,478,433 B2 | 7/2013 | Seem et al. | |
| 8,515,584 B2 | 8/2013 | Miller et al. | |
| 8,766,573 B2 | 7/2014 | Becerra et al. | |
| 8,965,586 B2 | 2/2015 | Miller et al. | |
| 9,043,034 B2 | 5/2015 | Miller et al. | |
| 9,464,818 B2 | 10/2016 | Holm et al. | |
| 9,519,295 B2 | 12/2016 | Burton | |
| 9,904,260 B2 * | 2/2018 | Lloyd | G05B 15/02 |
| 9,920,949 B2 * | 3/2018 | Xiong | F24F 11/30 |
| 10,061,288 B2 * | 8/2018 | Jablokov | G08C 17/02 |
| 2001/0010265 A1 | 8/2001 | Rayburn et al. | |
| 2003/0181158 A1 | 9/2003 | Schell et al. | |
| 2004/0108388 A1 | 6/2004 | Wacker | |
| 2005/0278071 A1 | 12/2005 | Durham | |
| 2005/0288824 A1 | 12/2005 | Fisher | |
| 2006/0117766 A1 | 6/2006 | Singh et al. | |
| 2006/0161306 A1 | 7/2006 | Federspiel | |
| 2007/0037507 A1 | 2/2007 | Liu | |
| 2007/0289322 A1 | 12/2007 | Mathews | |
| 2008/0014857 A1 | 1/2008 | Spadafora et al. | |
| 2008/0027568 A1 | 1/2008 | Pearson | |
| 2008/0076346 A1 | 3/2008 | Ahmed | |
| 2008/0108295 A1 | 5/2008 | Fischer et al. | |
| 2008/0307803 A1 | 12/2008 | Herzon | |
| 2009/0236432 A1 | 9/2009 | Malloy | |
| 2010/0082161 A1 | 4/2010 | Patch | |
| 2011/0056651 A1 | 3/2011 | Monk et al. | |
| 2011/0173999 A1 | 7/2011 | Lord et al. | |
| 2012/0221151 A1 | 8/2012 | Steinberg | |
| 2012/0283880 A1 | 11/2012 | Kreft et al. | |
| 2013/0024028 A1 | 1/2013 | Hadzidedic | |
| 2014/0207288 A1 | 7/2014 | Albrecht et al. | |
| 2014/0244051 A1 | 8/2014 | Rollins et al. | |

FOREIGN PATENT DOCUMENTS

| | | | | |
|---|---|---|---|---|
| WO | WO-2007114985 A2 | | 10/2007 | |
| WO | WO-2017215090 A1 * | | 12/2017 | F24F 11/00 |
| WO | WO-2018141085 A1 * | | 8/2018 | |

OTHER PUBLICATIONS

Balmer and Brown, "A Computer Study of the Energy Savings from Using Various Economizer Changeover Strategies in a Retail Store" (Feb. 1997).

Brown, "Maximize Energy Savings with Economizer Controls" published in the Air Conditioning, Heating and Refrigerations News (1996).

Emerson, The Application of Electronic Variable Speed Drives to Small Packaged Rooftop HVAC Units.

Honeywell International, Inc., W7459 A, B, C, D Solid State Economizer Logic Model.

Honeywell Product Data Brochure 63-2528 "W6210A, D, and W7210A, D Solid State Economizer Logic Module" (Sep. 1996).

Honeywell Product Data Brochure 63/2544 "W6215, W7215, W7460 Economizer Logic Module for Ventilation Control" (Apr. 1998).

Honeywell Product Data Brochure 63-8491 "The Cool Solution Honeywell Solid-Sate Economizer systems" (Jul. 1996).

Honeywell Publication 63-7036 "Solid State Economizer and Sensor Based Demand Control Ventilation Technical Literature Compilation" (Jul. 1998).

Honeywell Publication 63-8586 "Economizer Systems Quick Selection Guide" (Jun. 1998).

Honeywell Publication 63-8588 "Fresh Air Economizer Systems" (May 1998).

Honeywell Publication 63-8594 "Design and Application Guide for Honeywell Economizer Controls" (Jun. 1998).

Honeywell Publication 63-9058 "Research Finds Economizer Plus Demand Control Ventilation Delivers Highest Energy Savings" (Jun. 1998).

PCT International Search Report and Written Opinion of the International Searching Authority for Applicant's International Patent Application No. PCT/US2010/045734.

The Application of Electronic Variable Speed Drives to Small Packaged Rooftop HVAC Units; dated Jan. 10, 2005; pp. 1 to 5.

Wacker, "Economizer Savings Study" published in ASHRAE Transactions, vol. 5, Part 1 (1989).

European Search Report dated Mar. 10, 2015. 8 pp.

NexRev article which was filed as trademark specimen for Drivepak, U.S. Trademark Application No. 77668071 on Jan. 5, 2010; publication date unknown; last accessed May 16, 2016 at http://tsdr.

(56) References Cited

OTHER PUBLICATIONS uspto.gov/documentviewer?caseId=sn77668071&docid=SPE2010010613315#docindex=19&page=1.
Office Action regarding European Patent Application No. 10810474.6, dated Jul. 28, 2017.
First Examination Report regarding Indian Application No. 632/MUMNP/2012 dated Jul. 31, 2017.

* cited by examiner

ENERGY REDUCING RETROFIT APPARATUS FOR A CONSTANT VOLUME HVAC SYSTEM

RELATED APPLICATION

This application is a continuation of co-pending U.S. patent application Ser. No. 14/689,344, filed Apr. 17, 2015 entitled "Energy Reducing Retrofit Apparatus for a Constant Volume HVAC System," which is a divisional of U.S. patent application Ser. No. 14/563,941, filed Dec. 8, 2014 and which issued as U.S. Pat. No. 9,043,034 entitled "Energy Reducing Retrofit Method and Apparatus for a Constant Volume HVAC System," which is a continuation of U.S. patent application Ser. No. 13/920,331, filed Jun. 18, 2003 and which issued as U.S. Pat. No. 8,965,586 on Feb. 24, 2015 entitled "Energy Reducing Retrofit Method and Apparatus for a Constant Volume HVAC System," which is a continuation of U.S. patent application Ser. No. 12/544,960, filed Aug. 20, 2009 and which issued as U.S. Pat. No. 8,515,584 on Aug. 20, 2013, entitled "Energy Reducing Retrofit Method for a Constant Volume HVAC System."

TECHNICAL FIELD

The present invention relates to energy saving improvements to constant volume HVAC systems, particularly, the invention relates to the retrofit method and apparatus in order to control and reduce energy consumption through the use of an efficiency enhancing controller, a variable frequency drive, fault detection, and an optional occupancy sensor.

BACKGROUND OF THE INVENTION

HVAC (Heating, Ventilation, & Air Conditioning) systems are used to meet occupant comfort and ventilation needs within a building space. Typically this involves the conditioning of air circulated to and from the space served via an air handler of some form, e.g., fans and blowers. Conditioning the air can include any combination of heating, cooling, filtering, humidifying, & dehumidifying air in a defined building space. Additionally, most HVAC systems have provision for supplying minimum amounts of fresh outside air to insure proper ventilation for human occupants.

HVAC systems include constant volume systems and variable volume systems. Variable volume systems tend to be larger in capacity and generally more sophisticated in terms of control features. Constant volume rooftop packaged units and split systems equipped with economizers are much more common than variable volume systems. Enhanced features are rare in these systems due to cost considerations. Constant volume systems, as their name suggest, deliver a constant volume of air to the building. Moreover, constant volume systems typically serve a single zone or segregated space within a building.

The operation of these systems typically involves a room thermostat controlling the heating, cooling, and ventilation modes based on whether the space is occupied and the programmed heating and cooling set points. Whenever a non-residential space is open for business or has workers in the facility, the space is considered to be in the "Occupied Mode." In a constant volume system, the HVAC system's fan is commanded to operate at full capacity and the economizer provides minimum outside air for occupant ventilation throughout the occupied workday without regard to the temperature of the outside air. Changes in space temperature result in the thermostat sending commands to heat or cool the air being supplied to the space as necessary. The total amount of energy required to heat or mechanically cool the air is impacted by the temperature of the outside air entering the system. The colder the outside air is relative to the space, the greater the amount of energy required to heat the air. The hotter the outside air is relative to the space, the greater the amount of energy required to cool the air.

In virtually all constant volume systems the amount of outside air supplied to the space for ventilation is set for the maximum number of potential occupants anticipated in the space. For instance, a restaurant may have a dining room rated for 50 occupants. In this case, the HVAC system's minimum outside air setting will be based on the code required ventilation rate for 50 occupants. However, the dining room served by this HVAC system may only have 50 occupants at peak business hours or on rare occasions. The result is an over-ventilated space whenever there are less than 50 occupants. As stated previously, there is an energy cost associated with heating or cooling outside air. The status quo approach to occupant ventilation with these systems results in unnecessary energy usage.

Constant volume HVAC systems typically operate indoor blower motors at full capacity throughout the occupied period. The reality is that the fans do not need to operate at full capacity. Manufacturers provide a range of operation for acceptable airflow in the heating and cooling modes. A fan at full capacity typically exceeds the minimum allowable requirements. The ability to properly ventilate the space does not require the fan to be operated at 100 percent airflow. Once again these systems are not equipped with the ability to reduce fan speed and air volume in response to the true needs of space.

Sophisticated variable volume systems are able to vary the volume of air based upon the needs of the space. This can be achieved via older technologies such as inlet guide vanes or discharge dampers. Increasingly, variable volume systems rely on Variable Frequency Drives (VFD) for fan control. A VFD directly controls the speed of the fan and the air volume by reducing the motor revolutions per minute (RPM). Fan affinity laws prove that a 10% reduction in air volume or flow equals a 27% reduction in energy usage. This exponential energy dividend makes VFDs a highly valued energy efficiency tool. Once again, the cost of the VFD and the associated sensors, wiring, and installation labor has made the prospect of applying this technology to simple systems impractical. Additionally, the industry prior art has failed to identify a control strategy for applying variable volume technologies to retrofit a system designed to move a constant volume of air.

Constant volume systems are able to respond to the impact of changes in occupancy levels as they affect temperature, but they have no ability to respond to the varying ventilation needs associated with changing occupancy levels. For this to occur, these systems must have more intelligence and dynamic control capability.

Constant volume systems generally come in two distinct HVAC system types: rooftop packaged units and split systems. Rooftop packaged units are typically self-contained units mounted on a roof. Split systems typically include two sections: an indoor air handler/heating section and an outdoor compressor section connected to each other with refrigerant piping. Many of these systems are equipped with economizers. An economizer consists of mechanically-actuated outside air and return air dampers, temperature/humidity sensors, and an economizer controller. These components act together in such a way as to vary the amount of fresh outside air introduced by the HVAC system into the building space. The primary purpose of an economizer is to allow the HVAC system to utilize outside air for "free cooling" in the event that the space requires cooling and the outside air is suitable to be used as a source of cold air to cool the space. This allows the HVAC system to avoid the expense of operating the air conditioning compressor to make cold air.

Economizers are effective at lowering energy consumption if they are controlled properly and in good working order. Many studies by various utilities, energy consulting groups, and professional organizations report that 60-80% of economizers in the field are not working properly. Even properly working economizers often lack appropriate limitations on their operation when the HVAC system is operated during the unoccupied period (morning warm-up or night setback). Constant volume HVAC systems operate the economizer whenever the fan operates even though is not necessary to ventilate an unoccupied space. The most common flaw as it relates to ventilation during the occupied period is the improper positioning of the outside air damper resulting in an over-ventilated condition.

In larger, variable volume HVAC systems, one strategy to address this is through "Demand Control Ventilation" (DCV). The benefit of DCV is derived from being able to position the outside air damper to a closed or nearly closed condition unless there is a measured need for additional fresh air to the space. This is achieved by the use of an occupancy sensor. While other mechanisms may exist for calculating the occupancy level of a building, monitoring carbon dioxide levels is the most common. In such a case, a carbon dioxide ($CO_2$) sensor is mounted in the building space or in the return air duct. Human occupants exhale carbon dioxide and an increase in the number of occupants will produce a corresponding increase in the $CO_2$ levels. A controller is used to monitor the $CO_2$ levels and modulate the outside air damper open as necessary to dilute the $CO_2$ levels with fresh air. This dynamic approach to ventilation control eliminates the problem and energy expense associated with over-ventilating that comes with conventional strategies but has only rarely been applied as a retrofit measure with constant volume systems and not with ventilation fan reduction and/or heating/cooling fan reduction.

A traditional economizer in a constant volume HVAC system uses outside air for free cooling as an alternative to mechanical cooling compressor operation. The economizer controller determines the operation of the economizer by referencing the temperature and/or humidity of the outside air. When the thermostat communicates a call for cooling to the HVAC system, the economizer controller determines if the outside air is suitable for free cooling. If so, the outside air damper is modulated open and mechanical cooling is held off. The point at which this transition occurs is referred to as the "changeover point." If the outside air is not suitable, the economizer controller keeps the outside air damper in the minimum ventilation position and commands the compressor on for mechanical cooling.

In larger, variable volume HVAC systems, an "integrated economizer" strategy is implemented. This allows the simultaneous use of the compressor for mechanical cooling and outside air economization. The use of outside air may not be suitable for meeting the total cooling load but can still work to lower the energy consumption of the system. Whereas traditional economizer logic allows either the compressor OR outside air to function, an integrated economizer allows both to function together. Constant volume systems rarely include integrated economizer operation, but again not with the combination of ventilation fan reduction and/or heating/cooling fan reduction.

The most common style of changeover sensor is a "dry bulb" sensor. This is simply the measured sensible temperature of the outside air. A common dry bulb changeover temperature range is 55-60 degrees Fahrenheit. Dry bulb sensors are most prevalent because they are the lowest cost solution.

In areas where humidity is a particular concern, "enthalpy" changeover is often preferred. Humidity contains heat that cannot be measured by a dry bulb temperature probe or sensor. For this purpose, an enthalpy sensor is required. Enthalpy is a measurement of the "total" heat in the air and is measured in BTUs/lb of air. By using enthalpy control, the system more accurately assesses the suitability of outside air for free cooling. Optimizing the use of outside air for free cooling ultimately reduces the energy use of these HVAC systems.

Regardless of the changeover sensor used, any static changeover setpoint will fail to achieve the highest optimized condition when it comes to free cooling. While enthalpy does allow for better control of an economizer there are additional strategies available for improving energy usage. One of these strategies is known as "differential economizer control" and involves the use of two sensors. One sensor references the condition of the outside air and the other sensor references the condition of the return air from the space. Differential economizer control compares both sensors and decides if it is more advantageous to mechanically cool return air from the space or outside air. This strategy results in improved energy efficiency though is not typically used in constant volume systems due to cost considerations.

It is reported that approximately half of all U.S. commercial floor space is cooled by self-contained, packaged air-conditioning units, most of which sit on rooftops. The energy saving potential from optimizing the economizer, ventilation, and fan operation of these HVAC systems is enormous.

SUMMARY OF THE INVENTION

The invention works to solve many of the issues presented above by providing an enhanced programmable logic controller with a variable frequency drive capability to retrofit an existing constant volume HVAC system and mimic the efficiencies inherent in more sophisticated HVAC systems. By controlling the speed of the fan motor (and ergo the fan) to better match occupancy needs, the fan motor can be run at a significantly reduced speed in the ventilation mode. Controlling the speed of the fan motor (and ergo the fan) to maintain minimum manufacturer recommended airflow levels during the heating and cooling modes also provides a reduction in motor speed. Such reductions in the fan motor speed reduces current draw and, therefore, provide significant energy savings over prior art constant volume HVAC systems.

The method of retrofit provides a programmable logic controller and operably connects it to an existing thermostatic device and to existing heating and cooling equipment terminals. A variable frequency drive (VFD) that is controlled by the enhanced programmable logic controller is operably connected to an existing fan motor, itself connected to the existing HVAC fan.

The method of retrofit reduces the speed of the fan motor in the ventilation, heating and cooling modes.

The method of retrofit may further include demand control ventilation (DCV), in which an occupancy sensor (e.g., a Carbon Dioxide $CO_2$ sensor) is added to measure occupancy levels of the building space controlled by the HVAC system. $CO_2$ sensing is currently the most common measurement for determining occupancy levels within a space. The $CO_2$ sensor sends its sensed occupancy level to the controller. The controller modulates the speed of the fan motor (and ergo the fan) and the outside air damper position to match the needs of the space. The outside air damper is controlled by and operably connected to the enhanced programmable controller.

Further, the controller may also control a constant volume system that includes an economizer. The enhanced programmable logic controller is operably connected to an economizer actuator that operates the outside air and return air dampers in response to one or more sensors. The economizer sensor(s) may sense dry bulb air temperature, or enthalpy, or dew point.

According to other aspects of the present invention, additional energy savings may be further achieved through integrated economization, differential economizer control, and unoccupied damper control.

The method of retrofit may include "integrated economizer" where the enhanced programmable controller allows simultaneous mechanical compressor cooling and economizer free cooling operation to meet the cooling demand of the space.

The method of retrofit may include "differential economizer control" in which outside air and return air sensors are monitored and measured to determine the preferred source of air for cooling operations.

The method of retrofit may include "unoccupied damper control" in which the outside air damper is kept closed during the unoccupied heating modes, such as morning warm-up.

The enhanced programmable logic controller and VFD may be combined in a single efficiency enhancing controller (EEC) unit that can be readily adapted to an existing constant volume system without great expense or intrusion.

The method of the present retrofit invention, and related EEC apparatus, can reduce the fan speed by up to 80% depending on occupancy demands of the building space.

The method or apparatus may be used in a stand alone or networked version.

The method or apparatus of the present invention may be further enhanced with a networked version of the EEC and also include a fault detection capability. This enhanced embodiment may include a discharge air sensor, a current status switch, and a wireless transmitter.

These and other advantages will become more apparent upon review of the Drawings, the Detailed Description of the Invention, and the Claims.

BRIEF DESCRIPTION OF THE DRAWINGS

Like reference numerals are used to designate like parts throughout the several views of the drawings, wherein.

DETAILED DESCRIPTION OF THE INVENTION

The present invention is directed to a method and apparatus for significantly reducing energy consumption of an existing constant volume HVAC system with or without an economizer. In a constant volume HVAC system the fan runs continuously at the same speed, and the volume of air being supplied to the space does not change (constant air flow rates). A thermostatic control device (most commonly a thermostat) controls the heating and cooling operations. Economizers are the arrangement of dampers that control the quantity of return air (air coming back from the space being treated) and outside air (fresh air being used for cooling or ventilation). Here, the invention involves taking control over the existing fan, cooling, and heating operation, and optional economizer of the existing system.

In contrast to a constant volume system, a variable air volume system (VAV) relies on the reduction of air flow or fan motor speed (and ergo fan speed) to attain energy savings. However, variable air volume systems by their nature have a stable supply-air temperature, are more complex, expensive, and generally used for larger commercial buildings. The present invention retrofits a constant volume HVAC system and mimics the energy saving features of a variable air volume system but without the complexity and expense.

Figure 1:
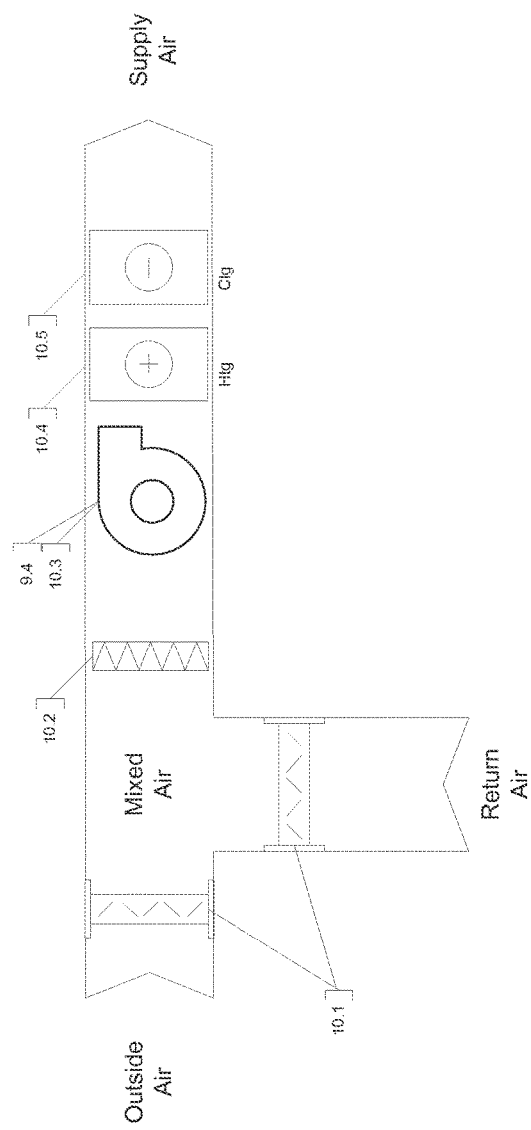
FIG. 1. is a schematic diagram of a prior art single zone HVAC constant volume system illustrating a fan and fan motor, heating, cooling, and economizer dampers.
Figure 2:
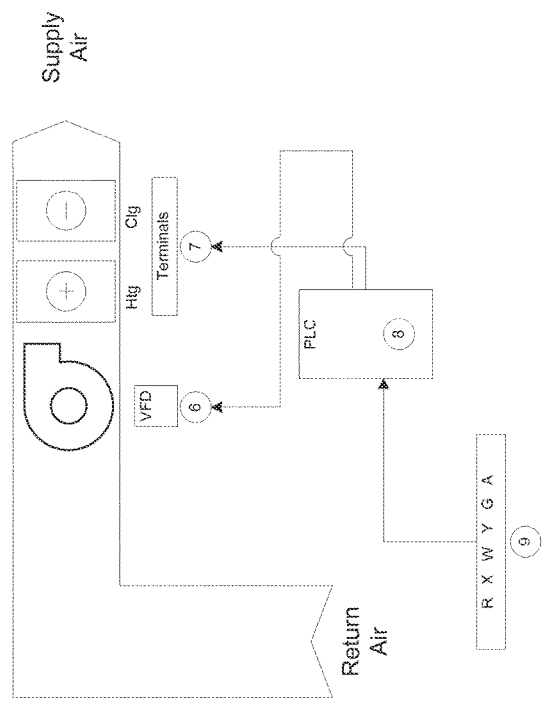
FIG. 2. is a schematic diagram illustrating an aspect of the energy saving HVAC system of the present invention in which an energy efficiency controller (EEC) is connected to an existing thermostatic device and takes control of the fan, cooling, and heating operations of the existing constant volume HVAC system.
Figure 3:
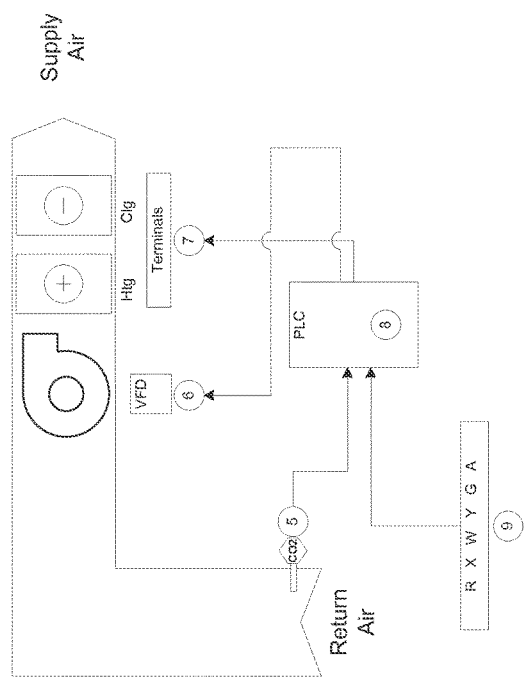
FIG. 3 is a schematic diagram illustrating an alternate embodiment of the energy saving HVAC system of the present invention in which an energy efficiency controller (EEC) takes control of the fan, economizer dampers, cooling and heating operations of the existing single zone HVAC constant volume system and adds occupancy based ventilation sensing and control capabilities (DCV)
Figure 4:
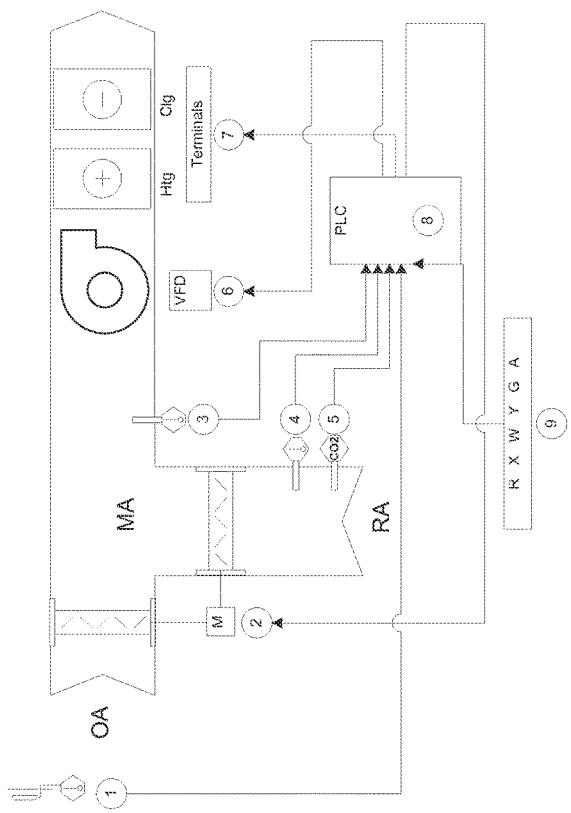
FIG. 4 is a schematic diagram illustrating another alternate embodiment of the energy saving HVAC system of the present invention in which an energy efficiency controller (EEC) takes control of the fan, economizer dampers, cooling and heating operations of the existing single zone HVAC constant volume system and adds occupancy control as well as sensor and control capabilities related to the economizer.
Figure 5:
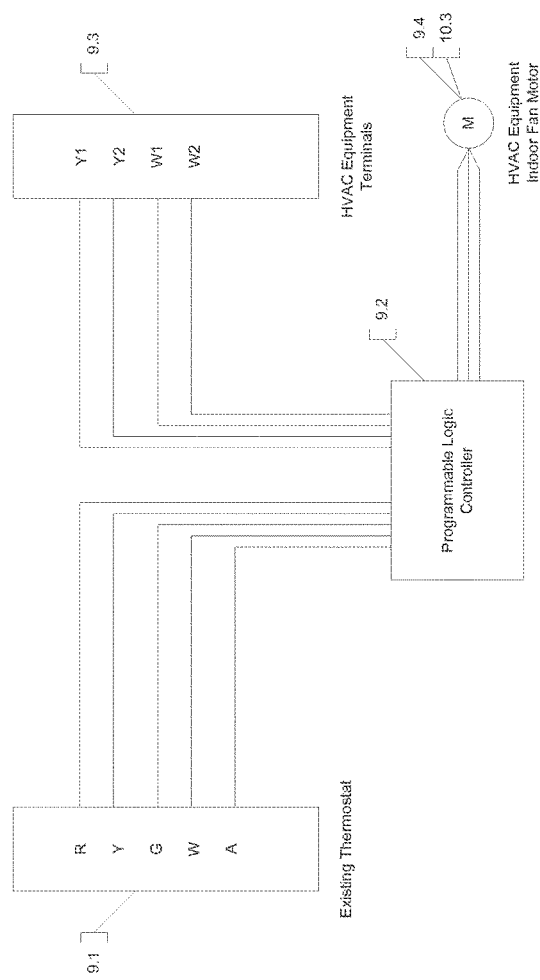
FIG. 5 is schematic diagram illustrating installation of an energy efficiency controller (EEC) across an existing thermostatic device and HVAC equipment terminals and controlling the fan motor.

Referring to FIG. 1, a prior art schematic of the key components of a constant volume HVAC system are illustrated. The prior art constant volume HVAC systems may have many components but in general having a fan assembly (fan 10.3, fan motor 9.4, blower), heating equipment 10.4, cooling equipment 10.5, a thermostatic device, means for delivering treated air to a specific building space, and means to control the temperature needs in a particular building space and to operate the fan motor, cooling equipment, and heating equipment when ventilation, cooling, or heating is requested. Some constant volume systems also include economizer dampers 10.1 to allow outside air into the system. As discussed above, the prior art system is not sophisticated and runs the fan at 100% capacity regardless of the call for heating, cooling, or ventilation needs. This system lacks optimum efficiency.

Now referring also to FIGS. 2-6, the present invention is a method and apparatus for retrofitting an existing constant volume HVAC system. The invention is designed to be minimally invasive and work with a multitude of unit styles and manufacturer brands and models. A new programmable controller having a central processor 3.10 and VFD 6 may be combined to form an efficiency enhancing controller (EEC) 8, are added to the existing constant volume HVAC system roughly illustrated in FIG. 1. These components can be installed individually or as a single unit, discussed in further detail below.

Figure 6:
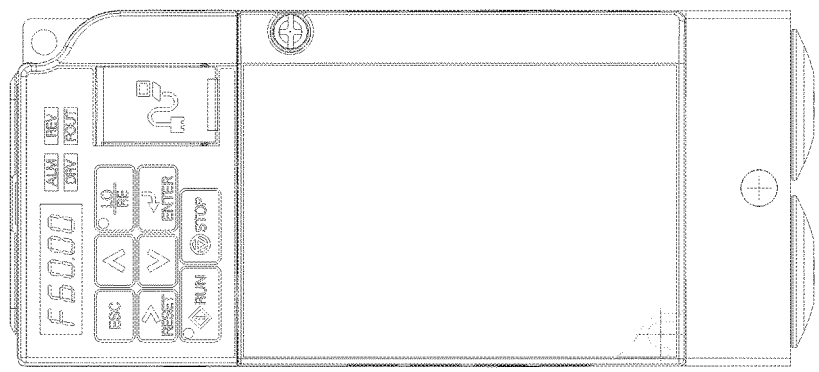
FIG. 6 is a front view of an exemplar unitary EEC of the present invention.

The EEC is intended to be installed between the existing thermostatic device [9.1] and the heating and cooling equipment control terminations [9.3], e.g., low voltage terminal blocks. The VFD of the EEC is connected to the fan motor [9.4], The programmable controller, such as a Red Lion G303, and VFD, may be incorporated into a single unit for efficiency, such as a Yaskawa VI000 Series. The single unit efficiency enhancing controller (EEC) 8, such as illustrated in FIG. 6, can receive and compare input signals, such as set point information or occupancy commands, and for relaying output signals to the fan motor (in operation, the ventilation mode) and controlling the heating equipment (in operation, the heating mode) and the cooling equipment (in operation, the cooling mode) when ventilation, heating, or cooling is required (occupancy demands) or desired (programmed system targets).

Now also referring generally to FIGS. 7-13, the thermostatic device (thermostat) [9.1] is an electronic or mechanical device that is used to keep the temperature of the space within an occupant defined range. The thermostatic device may be a simple thermostat or a unitary control device referencing a space sensor. The thermostat may or may not have scheduling capabilities. Scheduling gives the thermostatic device the ability to control at different temperature ranges during different times of the day. This is most commonly used for night setback, an operation where the defined control range of the thermostatic device is extended to increase energy savings when no occupants are in the space. The user defined range is often referred to as setpoints. When the temperature of the air drops below the heating setpoint, the thermostatic device will send via the programmable controller an electric signal to the HVAC equipment initiating a heat call. When the temperature of air in the space rises above the cooling setpoint the thermostatic device will send via the programmable controller an electric signal to the HVAC equipment initiating a cool call. The thermostatic device, via the programmable controller and the VFD, will also control the fan operation. The fan will run whenever the space is scheduled to be occupied. The fan will run whenever the thermostatic device initiates a signal for heating or cooling. Some thermostatic devices will also have an occupancy contact that will send an electric signal when the space is occupied.

The equipment low voltage terminal block [9.3] is where the thermostatic device makes electric connection with the HVAC equipment, typically at 24 vac. The HVAC equipment processes the electrical signals received from the thermostatic device and makes determinations about mechanically treating the air with either heating or cooling to provide comfort as needed.

Figure 7:
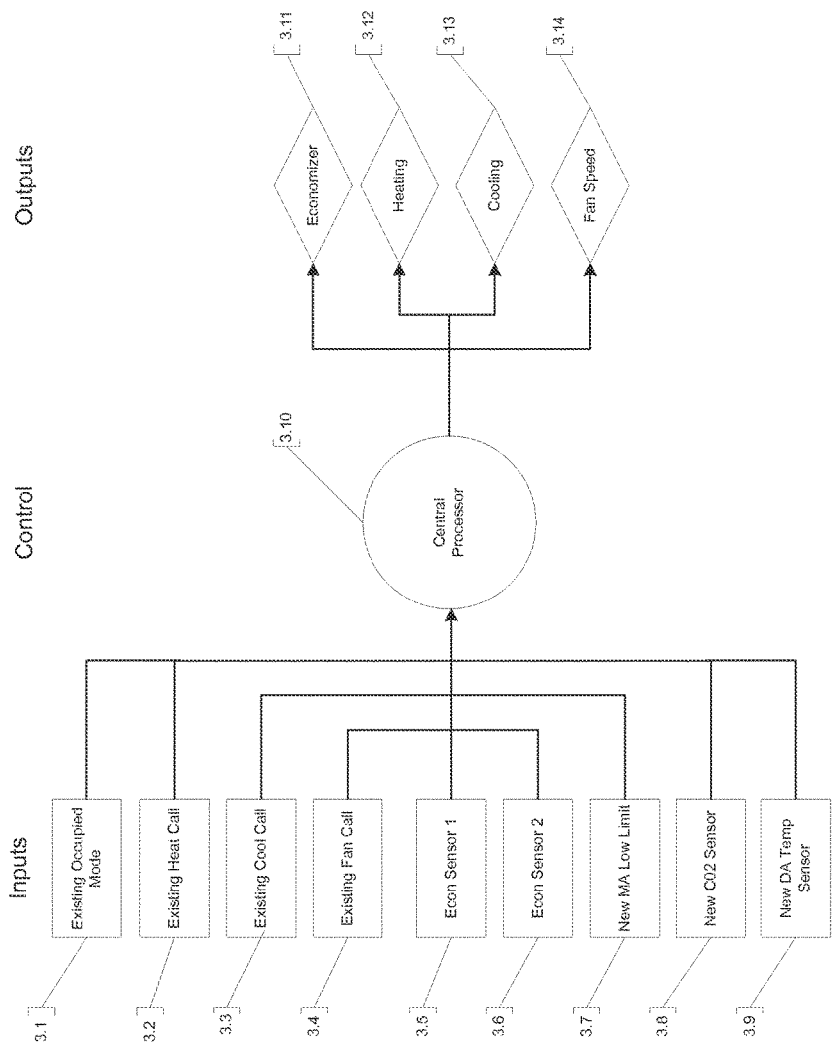
FIG. 7 is a logic chart illustrating the controller inputs and outputs of the present invention.

As illustrated in FIG. 7, the EEC controller will receive heating, cooling, fan, and optional occupancy commands from the thermostatic device via discrete digital inputs, including the optional economizer. Digital inputs are only capable of representing two states: off or on. As required by the sequence defined below, the EEC will send low voltage electric signals for heating or cooling to the equipment terminal connections via discrete digital outputs. The EEC (through the VFD) will control the fan speed by connecting directly to the line voltage input of the existing fan motor. The fan motor is connected either via a pulley or directly to a fan that is used to circulate air through the space. The line voltage for the fan will be between 200-500 vac.

The central processor remains in an idle state until the existing thermostatic device [9.1] calls for the fan to come on. When the thermostatic device [9.1], via the EEC, sends an electric signal to turn the fan on, the EEC (through the VFD) will control the fan to its new ventilation speed. All low voltage signals from the thermostatic device will be processed by the EEC central processor. When the fan is enabled, the system will look to receive either a heat call or a cool call from the thermostatic device. The system also looks for an occupancy command from the thermostatic device.

Figure 8:
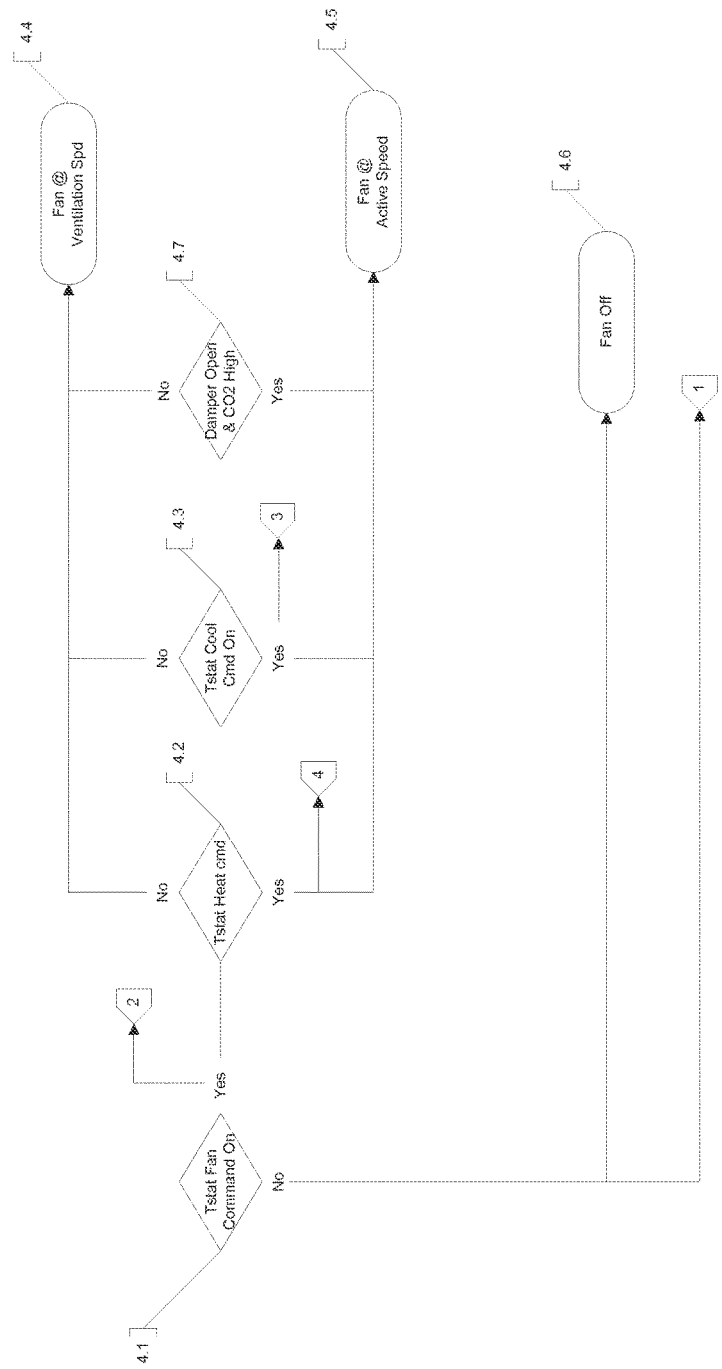
FIG. 8 is a logic chart illustrating the fan or ventilation mode as controlled by the EEC.

Now referring particularly to FIG. 8, ventilation mode occurs when there is no need to heat or cool the space. During ventilation mode the fan will run at a preset speed between 20-100%. The actual ventilation rate will be determined on a case-by-case basis, but the typical ventilation rate will be a fan speed between 40-60%. The purpose is to find the lowest possible speed at which occupancy indoor air quality or code required ventilation rates can still be met. Such a reduction in the fan speed results in energy savings compared with the status quo of operating the fan at 100% capacity during the ventilation mode.

The VFD changes the frequency of the power that is being supplied to the motor as a means to vary motor speed. Standard electrical frequency in the United States is 60 Hz. A speed reference of 0-100% equals a frequency range of 0-60 Hz; at 60 HZ a motor is at maximum speed.

Acceptable ventilation may be determined by an occupancy sensing device. Occupancy can be determined by any device that can accurately measure how many people are in a space; there are several methods of determining occupancy such as turn-styles or key card access systems. The device is capable of accepting many different occupancy inputs, such as sensing carbon dioxide levels, turn-styles, or key card access systems. But the preferred method is the use of a $CO_2$ sensor, such as an Airtest EE80-2CS. Humans produce $CO_2$ as a byproduct of breathing. The ambient $CO_2$ is typically 450 PPM. Ventilation codes based on industry guidelines such as ASHRAE 2004 62.1 allows the use of $CO_2$ sensors to determine space occupancy for ventilation purposes. The ventilation fan speed may be set to keep the $CO_2$ level in the space between a code-permissible 650-750 PPM while the outside air damper is at minimum position. The ventilation rate may need to be increased above this level in order to maintain occupant indoor air quality by providing enough fresh outside air to overcome issues like excessive odors and stale air.

Figure 16:
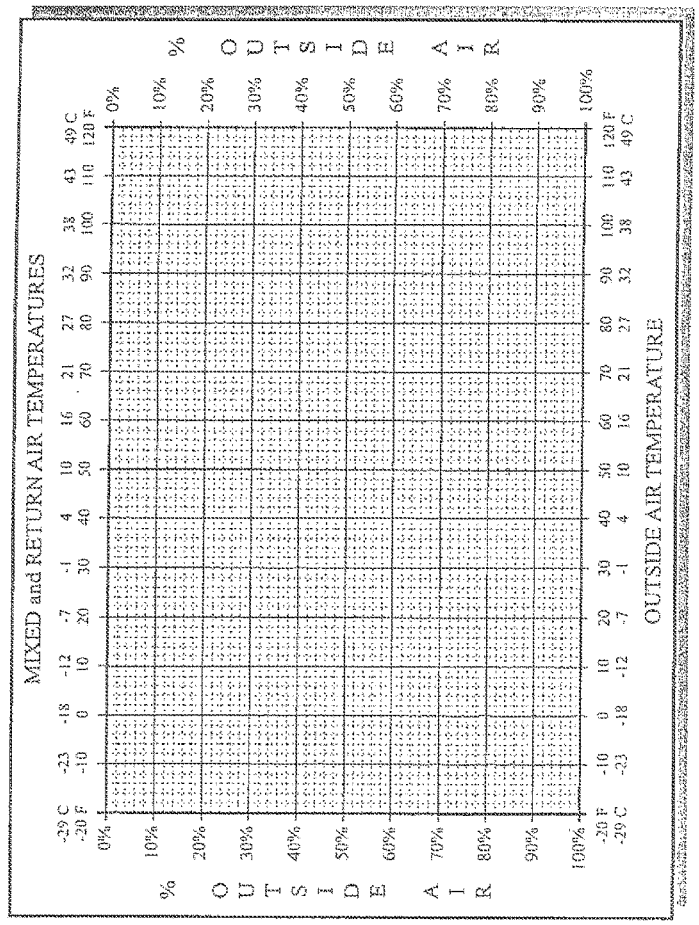
FIG. 16 is a mixed air temperature chart.

Per code requirements, commercial buildings require fresh air for ventilation. Ventilation is typically achieved through the outside air damper of the economizer. A $CO_2$ sensor, as discussed above, may be installed to determine acceptable ventilation levels. The economizer will operate at minimum position when there is no call for heating or cooling and the space is occupied. A minimum position typically will be set to 5%. A mixed air temperature chart, such as illustrated in FIG. 16, may also be used to set the minimum position.

At setup, the installing technician will measure return air, outside air, and mixed air. Return air is the air coming back from the space. Outside air is the ambient condition surrounding the unit. Mixed air is where the return air and outside air are mixed together; it is after the dampers and before any heating or cooling coils. Technicians will use the mixed air chart and the measured values to establish the appropriate outside air damper position. The economizer position is expressed in a percentage, as it pertains to the outside air is damper is a reference of percentage open. The economizer position as expressed in percentages, as it pertains to the return air damper is a reference of percentage closed. When the minimum economizer position is at 5% the outside air damper is 5% open and the return air damper is 5% closed (or 95% open). If damper appears to be all of the way closed, but the measurements show air leakage is greater than 5%, the damper will be left in this closed position for minimum ventilation. Air leakage is the ability of the outside air to infiltrate past a closed damper and influence the temperature of the mixed air.

If the $CO_2$ in the space rises above a selected level, such as 1200 PPM as measured by the $CO_2$ sensor, the economizer will be modulated open to attempt to keep the $CO_2$ levels at the selected level. Modulate means the control output (in this case the economizer configuration) is varied throughout a control range to match the needs of the space. The $CO_2$ control will be based on a PID (proportional plus integral derivative) loop to continuously calculate the percentage of ventilation that is needed to maintain ventilation levels and take corrective action as needed to reach the setpoint. The proportional effect is how far the value is away from the setpoint. The integral effect is how long (in seconds) the deviation from the setpoint has existed. The derivative effect, though rarely used, considers sudden variations. All of these values are combined to determine the output level needed to satisfy the setpoint.

If the damper reaches 100% for a selected period of time, e.g., 10 minutes, and the $CO_2$ level is greater than a selected level of concentration, e.g., 1500 PPM, the fan speed will change to meet the increase in ventilation needs. The fan speed will ramp at a selectable rate, e.g., 1% every 5 seconds) until the $CO_2$ level drops below the selected concentration, e.g., 1450 PPM. If the ventilation rate starts to drop below a selected concentration, e.g., 1350 PPM, the fan will ramp down at a selectable rate (such as already mentioned above) until the fan is at its ventilation speed.

Figure 9:
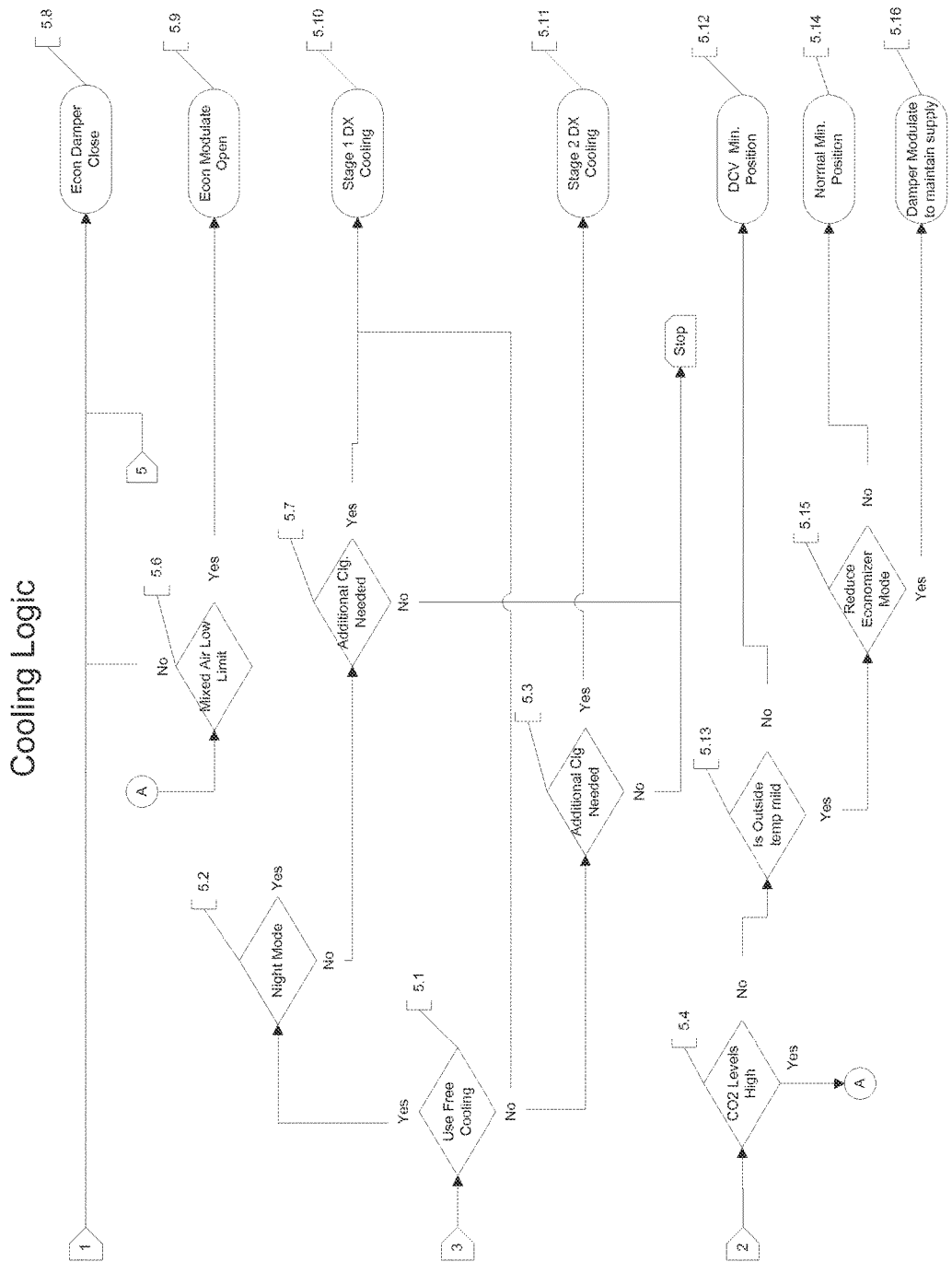
FIG. 9 is a logic chart illustrating the cooling mode as controlled by the EEC.
Figure 10:
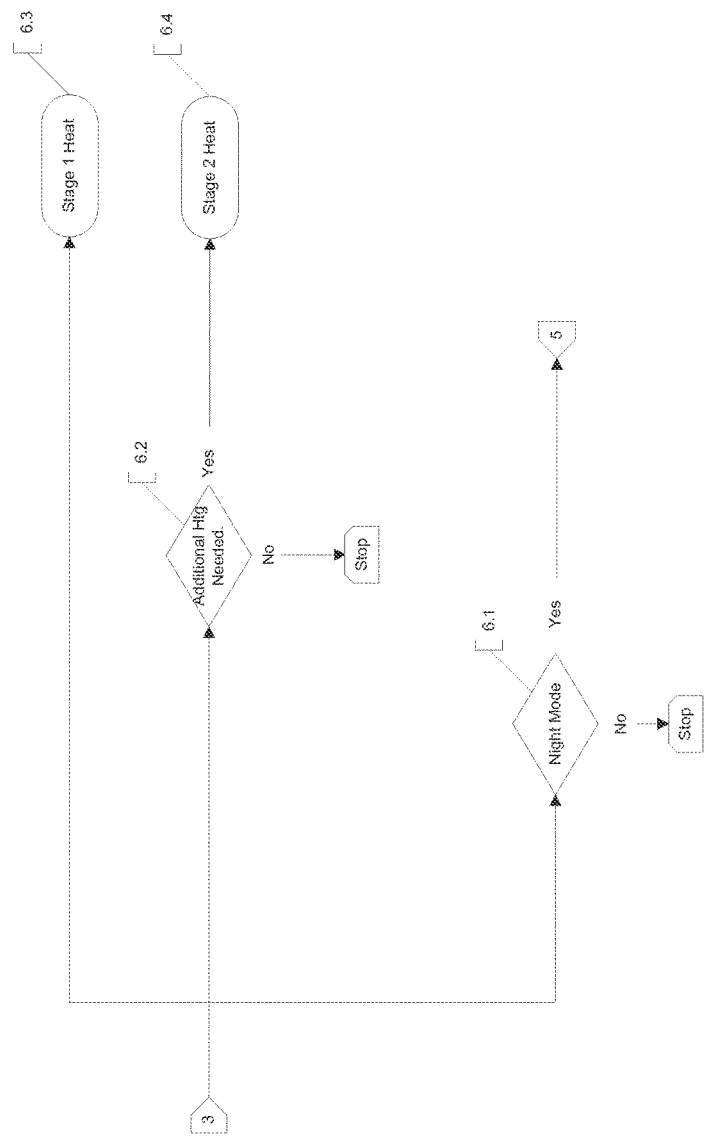
FIG. 10 is a logic chart illustrating the heating mode as controlled by the EEC.

Now referring particularly to FIGS. 9 and 10, when the central processor receives a signal from the thermostatic device that heat is needed and the thermostatic device does not indicate occupancy, the EEC is either in a night heating or morning warm-up mode, and the outside air damper will remain closed. This function known as "unoccupied damper control" may not be implemented on all units because not all thermostatic devices have an occupancy output.

"Single stage equipment" are units that have only one stage of mechanical heating and/or cooling. Multiple stage equipment has multiple means to mechanically heat and/or cool the air. It is common to have between two and four stages on multi-stage cooling equipment. Each stage of cooling adds additional capacity, until the unit reaches its maximum capacity with all stages engaged. In heating, two stages are most common for multi-stage equipment. Each stage of heating adds additional capacity until the unit reaches its maximum capacity with all stages engaged.

In a single stage unit, on a signal for cooling from the thermostatic device, the fan will run at a reduced speed, typically at 90% of maximum speed, or no less than the manufacturer's minimum recommended airflow. This reduction in fan speed results in energy savings compared with the status quo of operating fans at 100% during the cooling mode. The VFD will adjust the frequency of the line power supplied to the motor to achieve the desired speed.

In multistage units, the fan may be controlled under one of two scenarios: 1) "consistently reduced" (e.g., 90%); or 2) "ramp-with-demand." In the consistently reduced scenario, the fan will operate at 90% speed whenever the thermostatic device sends a signal for any stage of cooling. In a "ramp-with-demand" scenario, the fan speed will increase (ramp) as the unit is required to produce additional levels of cooling (demand). Each individual stage of the multistage equipment will add to the capacity (measured in tons) that the unit is producing. During initial installation, the field programmer will enter a value into the EEC central processor for tons per stage. The EEC central processor will control the fan speed to maintain no less than the manufacturer's recommended airflow (e.g., 360 CFM/per ton). For example, if there are four stages and 20 total tons of capacity, the technician would enter 5 tons per stage. If two stages are engaged, then the unit would modulate the fan to maintain 3600 CFM based on industry standard minimums of 360 CFM per ton. In the ramp with demand scenario, an air flow sensor will be installed in the supply air duct to measure air flow. Air flow will be measure in velocity (feet/minute), and the central processor will convert the signal to volume (CFM). The EEC central processor may use a PID control loop (as described above) to maintain a necessary fan speed to meet the CFM requirements. The VFD would adjust the frequency of the line power supplied to the motor to achieve the desired speed. Collectively, these changes from status quo fan speed control result in valuable energy savings.

Figure 11:
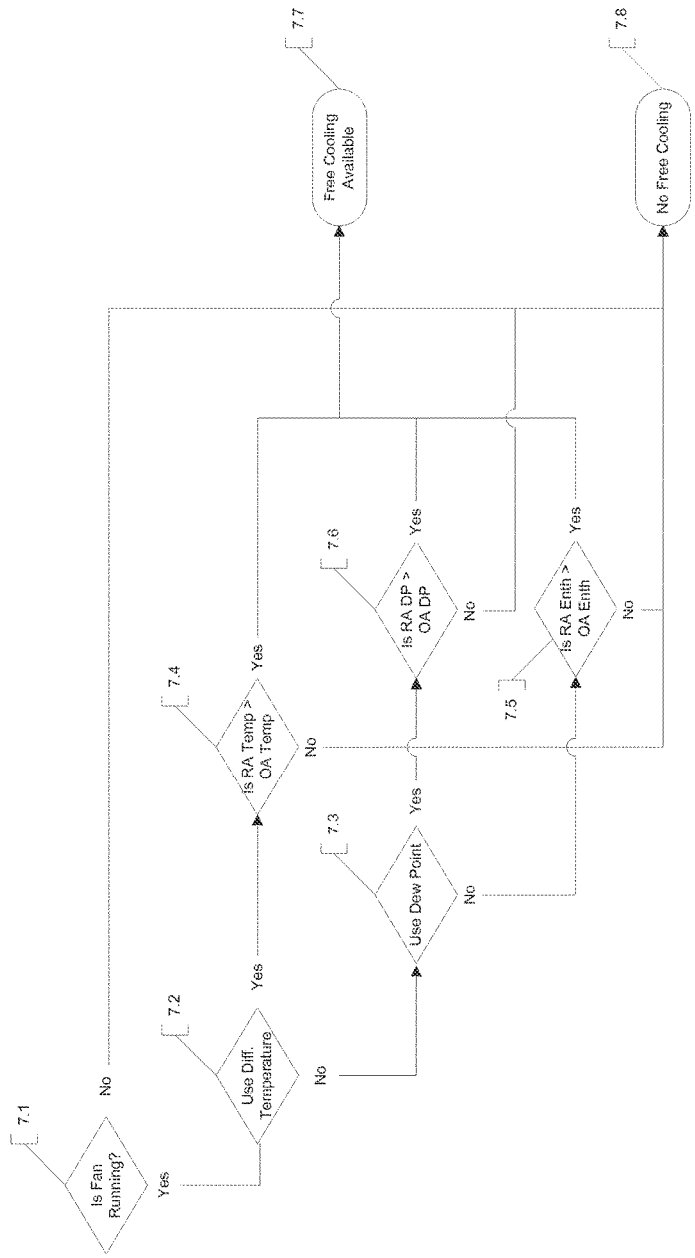
FIG. 11 is a logic chart illustrating the economizer mode as controlled by the EEC.

Now referring also to FIG. 11, the EEC will determine if the unit should operate in economizer mode when the thermostatic device sends a signal for cooling. Economizer mode is when the HVAC equipment uses suitable outside air to treat the space being conditioned. In economizer mode the outside air damper will open and the return air damper will close as necessary; outside air will be provided to the space in an attempt to satisfy the cooling demand. If the outside air is unsuitable for cooling then the economizer damper will be set to its minimum position and mechanical cooling will be enabled. If the thermostatic device sends a signal for cooling in an unoccupied mode, and the outside air is suitable for free cooling, the economizer will use outside air to satisfy the space demand, and mechanical cooling will be locked out from operating. If the thermostatic device sends a signal for cooling in an unoccupied mode and the outside air is not suitable for free air cooling, the economizer will remain closed and mechanical cooling will be used to satisfy the space. One of three variables will be used by the EEC to determine if the outside air is suitable for free cooling. These variables are enthalpy, temperature, or dew point.

When the economizer is enabled it will be modulated to maintain a 55° F. supply air temperature. A PID loop will control the output that is connected to an economizer actuator. The outside air damper will be opened proportionately to meet the demand required to maintain the supply air setpoint. An actuator is a motor that is used to control damper position. An analog output will be used to control the actuator position. An analog output is the variable electric signal generated by the central processor in response to a command. Commonly, a command of 0-100% will be converted to an electric signal of 0-10 vdc.

In the event that the outside air is determined to be incapable of adequately cooling the space, a differential economizer control strategy may be utilized. Mechanical cooling is activated and the economizer is now controlled based on one of three comparative strategies: differential enthalpy, differential temperature, or differential dew point.

Differential enthalpy requires the following sensors: outside air enthalpy and return air enthalpy. Enthalpy, measured in BTU/lb of air, is a measurement of the total heat quantity in the air. Enthalpy is a combination of the temperature and humidity in the air. Enthalpy is particularly useful in areas with high humidity. Enthalpy takes into consideration the latent heat in the moisture that humidity adds to the air being treated. The enthalpy sensors, such as Honeywell C7400A1004, are connected to the analog inputs of the EEC. The analog input can accept either a varying voltage, current, or resistive signal from a field sensor. The analog input reads the changing electric value and converts it to useable data. For example, in the case of the enthalpy sensor, a range of 15-40 BTU/lb of air has an electric signal of 4-20 mA. Differential enthalpy involves the logical comparison of the enthalpy of the outside air and the enthalpy of the return air. If the outside air has a lower heat quantity than the return air, the outside air is the preferred source for cooling operations and economizer mode is enabled. Less energy is required to mechanically cool the outside air because it has a lower heat quantity than the return air.

In areas of low humidity, differential temperature economizer control may be implemented. The concept of differential temperature is similar to enthalpy, but differential temperature does not factor in the latent heat in the moisture of the air. In the case of differential temperature, a return air temperature sensor and an outside air temperature sensor will be connected to the EEC analog inputs. Differential temperature involves the logical comparison of the temperature of the outside air and the temperature of the return air. The lower of the two temperatures will determine whether outside air or return air is the preferred source for cooling operations and economizer mode is enabled, resulting in lower energy consumption.

Differential dew point is the final changeover method. For dew point economizer control temperature and humidity sensors will sense both the return air and outside air conditions and be connected to the EEC analog inputs. The EEC will calculate dew point based on the temperature and humidity readings. Differential dew point involves the logical comparison of the return air and outside air values. If the calculated dew point of the outside air is less than calculated dew point of the return air, the outside air is the preferred source for cooling operations and economizer mode is enabled. It will require less energy to mechanically cool the outside air because it has a lower dew point than the return air.

The EEC will control the mechanical cooling functions, namely, the HVAC equipment's ability to mechanically lower the temperature of air in the building space. In most systems mechanical cooling will be achieved through a compressor and refrigeration cycle. Mechanical cooling will be enabled when there is a signal from the thermostatic device and free cooling is not available, or if the economizer mode alone is unable to keep up with the demand. If the economizer is fully open for a selectable period of time (e.g., ten minutes) and the return air temperature or enthalpy has not decreased by a selectable percentage (e.g., 5%) mechanical cooling will be enabled. Or, if the economizer is fully open for a selectable period of time (e.g., 15 minutes) and the space temperature setpoint remains unsatisfied, mechanical cooling will be enabled. The present invention may utilize the practice of simultaneous economizer and mechanical cooling operation known as "integrated economizer" until the outside air is determined to be unsuitable. Once mechanical cooling has been initiated, each stage of mechanical cooling must run for a selected minimum amount of time, typically 3-5 minutes. Once it has been turned off, each stage of cooling must remain off for a select minimum amount of time, typically 3-5 minutes, before it can be turned back on.

Referring again to FIG. 9, on HVAC equipment with multiple stages of cooling, the first stage of cooling will be initiated when mechanical cooling is needed. If the first stage of cooling is still on after a selected amount of time (e.g., 5 minutes), and return air temperature or enthalpy has not decreased by a selected percentage (e.g., 5%), the second stage of cooling is turned on. If the first stage of cooling is on for a selected amount of time (e.g., 10 minutes), the second stage of cooling will be turned on. This process will repeat for all subsequent stages of cooling until all stages of cooling are on, or the space cooling demands have become satisfied.

Referring again to FIG. 10, the ECC will control the mechanical heating functions. Mechanical heating refers to any method used by the HVAC equipment to mechanically raise the temperature of air in the space. In most systems mechanical heating will be achieved through gas heating, electric strip heating, or compressor and refrigeration cycle (heat pump). In a single stage unit, when mechanical heating is needed the only stage of heating will turn on. When the heating is on, the temperature of the air being supplied to the space will increase and the space will heat up.

On HVAC equipment with multiple stages of heat, when mechanical heating is needed, the first stage of heating will come on. If the first stage of heating is still on after a selected amount of time, e.g., 5 minutes, and the return air temperature or enthalpy has not increased by a selected percentage, e.g., 5%, the second stage of heating is turned on. If the first stage of heating is on for a selected amount of time, e.g., 10 minutes, the second stage of heating will be turned on. This process will repeat for all subsequent stages of heating until all stages of heating are on, or the space becomes satisfied. Once heating has been initiated, each stage of heating must run for a selected minimum of amount of time, typically 3-5 minutes. Once it has been turned off, each stage of heating must remain off a selected minimum amount of time, typically 3-5 minutes, before it can be turned back on.

Figure 12:
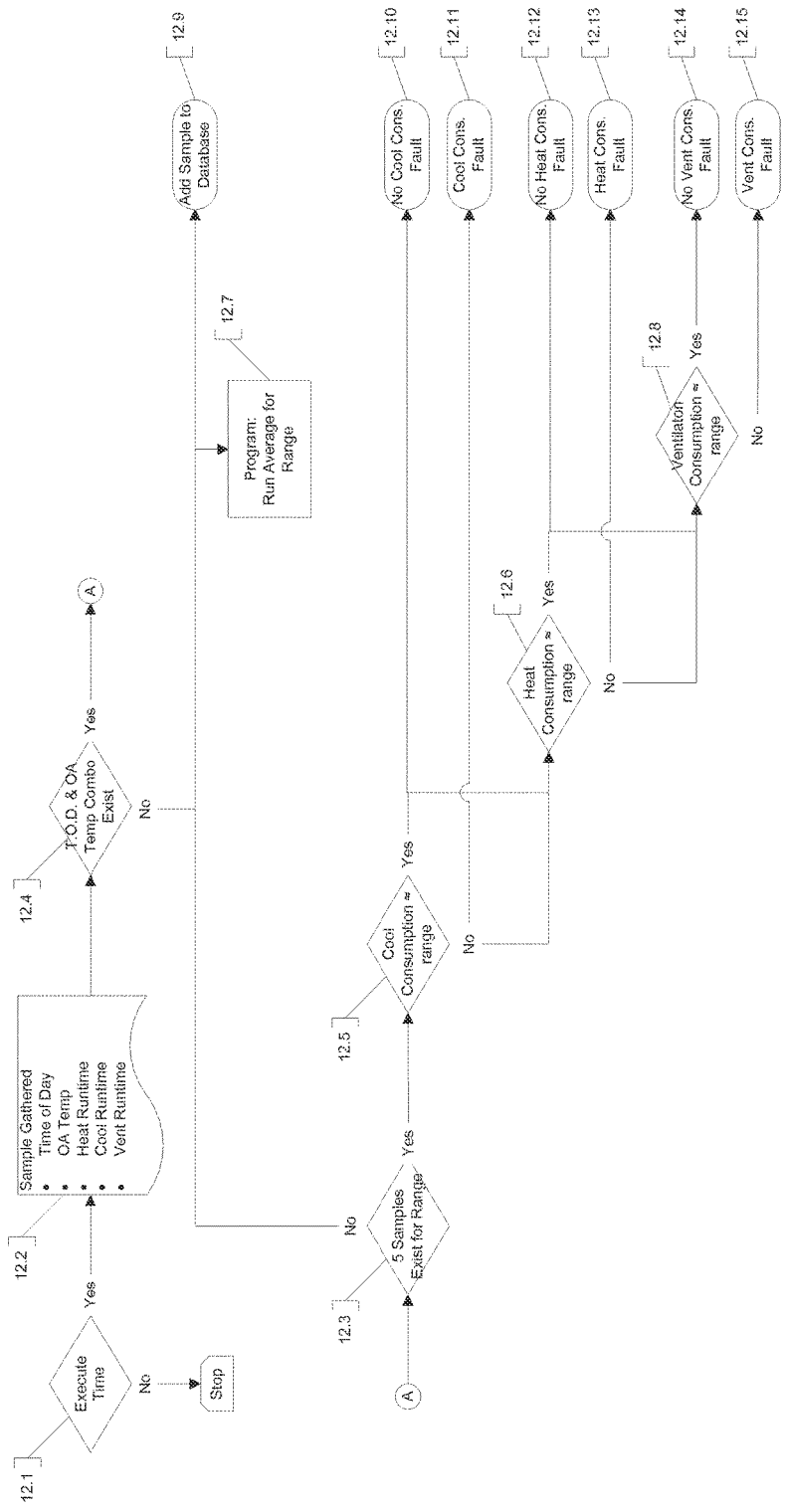
FIG. 12 is a logic chart illustrating fault data storage and detection.
Figure 13:
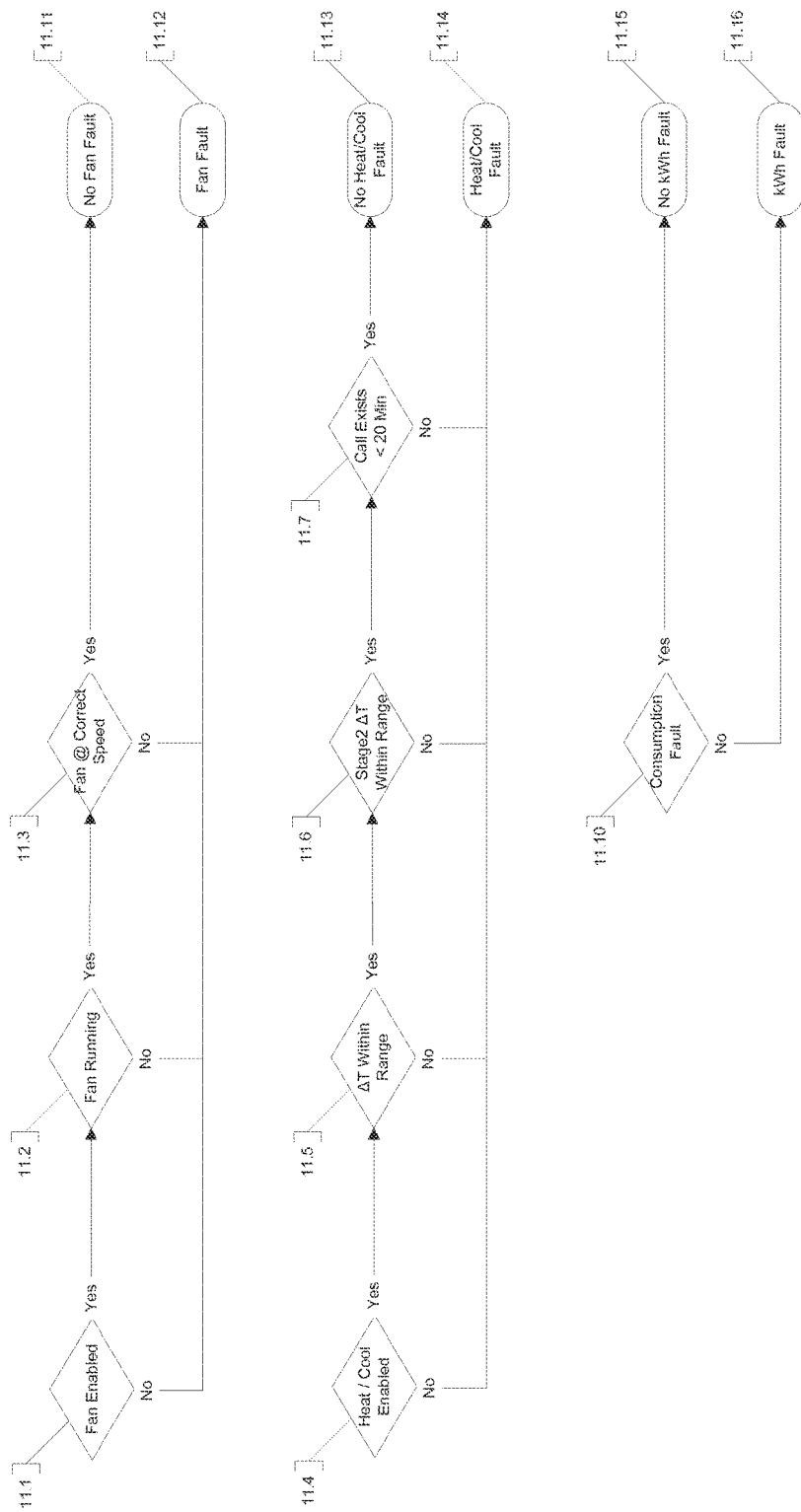
FIG. 13 is a logic chart illustrating additional fault detection methods.

Referring now to FIGS. 12 and 13, the invention may be equipped with an advanced diagnostic and fault detection capability. For the purposes of fault detection, a discharge air temperature sensor may be added to each individual HVAC system. There are three fault processes that are calculated: fan fault [11.1], heat/cool (temperature-based) fault [11.4], and an energy consumption (kWh) fault [11.8]. The fan [11.1] and temperature [11.4] faults are interconnected. The system will first run through the fan logic, and then run through the heat/cool logic. The energy consumption fault [11.8] is independent, and runs continuously while the unit is in operation.

The fan fault [11.1] is initiated whenever there is a call for the fan to operate [3.4]. The EEC processor first verifies that the fan status is proven. If the fan status does not prove within a select amount of time (e.g., 30 seconds) from the fan "on" command [3.4], the "fan running" fault [11.2] will trigger a fan fault [11.12]. If the "fan running" fault [11.2] does not exist, the system will then analyze the motor speed [11.3]. If the system is not calling for heat [3.2], cool [3.3], or additional ventilation [4.7], the fan should be operating at the ventilation speed setpoint [4.4]. If the fan is not at the correct ventilation speed [11.3] it will trigger a fan fault alarm [11.2].

Assuming there are no fan faults [11.1] the system will begin to analyze the temperatures for heat/cool based faults [11.4]. Depending on the mode of operation (heat [3.2] or cool [3.3]) the system will look for a drop or a rise in the discharge air temperature [11.9]. If the system does not see a change in discharge temperature [3.9] after a selected amount of time (e.g., 10 minutes) the system will initiate a heat/cool fault alarm [11.14]. If the system has additional stages of heating [6.4] or cooling [5.11] the system will look for an additional change in the discharge temperature [3.9]. If there is not a change in temperature when additional stages are enabled the system will initiate a heat/cool fault alarm [11.14], If the heating call [3.2] or cooling call [3.3] exists without interruption for more than a select period of time, (e.g., 30 minutes), a "time-in-mode" fault [11.7] will trigger the heat/cool alarm [11.14]. If none of the previous conditions exist, the system will not have a heat/cool fault condition [11.14].

The energy consumption fault circuit [11.10] will run whenever the unit is powered up. The consumption fault detection logic is set to gather system data at preset intervals. The intervals can be adjusted by the programmer in the field. The fault detection comparisons will start when the when the designated time interval has elapsed [12.1]. The system will gather the average outside air temperature, heat mode runtime, cool mode runtime, and the ventilation mode runtime [12.2]. The system will then scan an internal database [12.4] for a matching sample time of day and outside air combination. If the matching combination does not exist, the information will be added to the database [12.9]. If the combination does exist in the database, the controller will first look to see if there are a sufficient number of values (e.g., 5) for the combination [12.3]. If there are a minimum number of stored values for the range, the controller is deemed to have enough historical data to provide a valid comparison. The controller will compare the sampled energy consumption amounts [12.2] against the items stored in the database. If the consumption is not within the normal range of values, then an energy consumption fault will be triggered. If the value is within the normal range, then no fault will be triggered. The controller will analyze for cooling consumption [12.5], heating consumption [12.6], and ventilation consumption [12.8]. Each mode is capable of issuing a corresponding fault or no fault condition [12.10-12.15].

Energy conservation is achieved through this fault detection and reporting feature by alerting operators when the unit is using excessive energy. This may be due to inappropriate changes in the unit's operating schedule, low refrigerant charge, or other mechanical issues.

Figure 14:
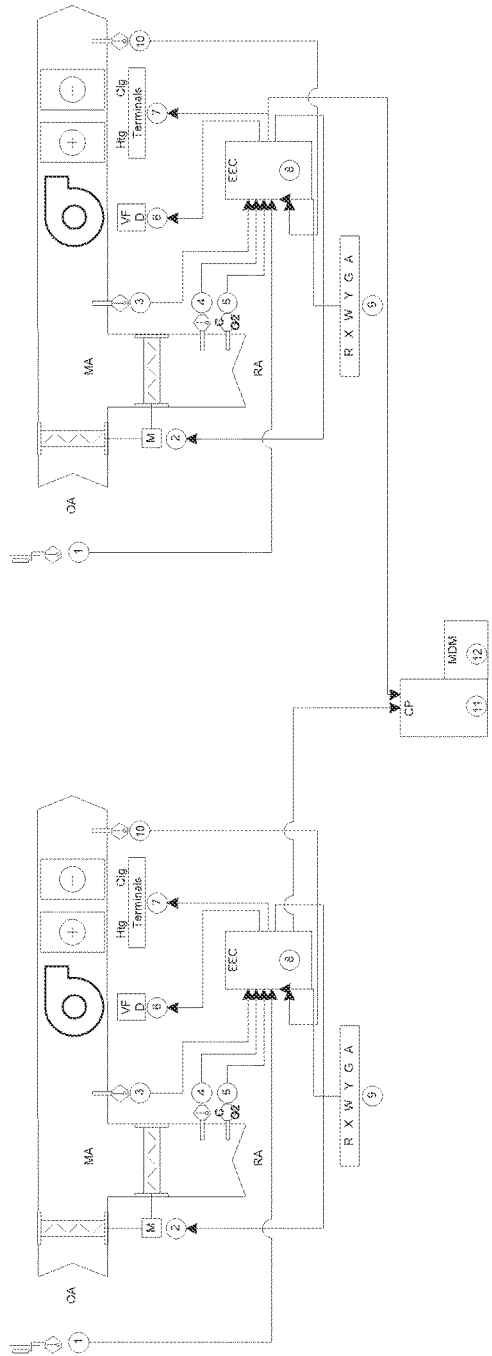
FIG. 14 is a schematic diagram illustrating a networked version of the present invention.
Figure 15:
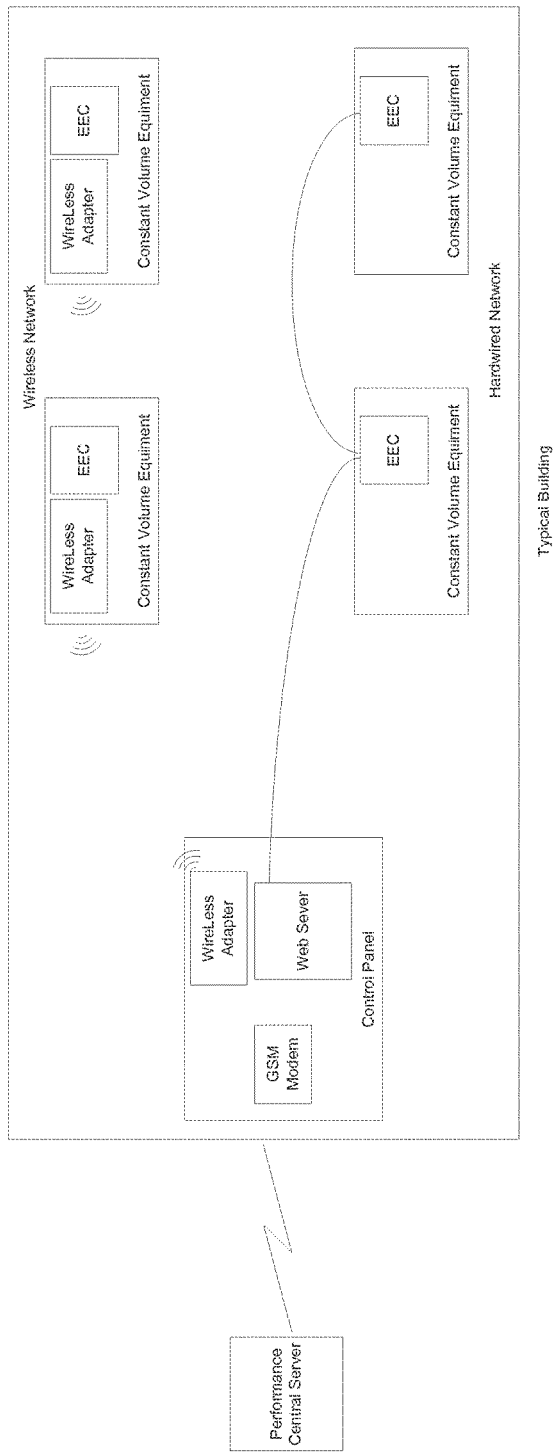
FIG. 15 is a schematic diagram illustrating a network layout.

For the purpose of remote communication, monitoring and data collection the present method and EEC apparatus may be utilized in a networked version (as opposed to a stand alone version) schematically represented in FIGS. 14 and 15. A central processor 11 (e.g., a computer), a modem 12, or other communication means are added to each networked system. The central processor 11 is connected in a wired or wireless configuration to each EEC/controller and gathers data from each device.

The EEC will be manufactured and applied in different embodiments to match the individual equipment and building space needs. One embodiment of the EEC consists of fan speed control, where the fan operates at different speeds depending upon whether there is a call for heating or cooling or if the system is in the ventilation mode. Another embodiment of the EEC consists of fan speed control based on a need for heating, cooling, and occupancy based ventilation, where the ventilation needs are based on an input form an occupancy sensor. Another embodiment of the EEC controls the fan speed based on heating, cooling, ventilation, and advanced economizer strategies including unoccupied damper control, differential change-over, and integrated economizer control. The individual versions of the EEC can be implemented in a networked or stand alone version and may include the capability for fault detection.

All the disclosed embodiments of the invention disclosed herein can be made and used without undue experimentation in light of the disclosure. Although the best mode of carrying out the invention contemplated by the inventors is disclosed, practice of the invention is not limited thereto. Accordingly, it will be appreciated by those skilled in the art that the invention may be practiced otherwise than as specifically described herein.

The individual components need not be formed in the disclosed shapes, or combined in the disclosed configurations, but could be provided in virtually any shapes, and/or combined in virtually any configuration. Further, the individual components need not be fabricated from the disclosed materials, but could be fabricated from virtually any suitable materials.

Variations may be made in the steps or in the sequence of steps composing methods described herein. All the disclosed elements and features of each disclosed embodiment can be combined with, or substituted for, the disclosed elements and features of every other disclosed embodiment except where such elements or features are mutually exclusive.

It will be manifest that various substitutions, modifications, additions and/or rearrangements of the features of the invention may be made without deviating from the spirit and/or scope of the underlying inventive concept. It is deemed that the spirit and/or scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

What is claimed is:

1. An efficiency enhancing controller (EEC) for enhancing energy efficiency in an indoor space of a building having an occupancy that is served by a single zone constant volume HVAC system, the EEC comprising:

(a) a programmable logic controller adaptable for the single zone constant volume HVAC system configured to receive input signals from sensors and a thermostatic device and send control heating, cooling, and ventilation instructions or an occupancy command to:
  (1) a fan assembly, including a fan motor configured to operate in a range of fan motor speeds, of the single zone constant volume HVAC system to ventilate an indoor space in a building;
  (2) a heating assembly that can send heat to the indoor space; and
  (3) a cooling assembly that can send cooling to the indoor space; and
(b) a variable frequency drive (VFD) that is configured to receive signals from the programmable logic controller and is configured to control a speed of the fan motor of the fan assembly;
wherein the programmable logic controller is configured to reduce the fan motor speed via the VFD when the sensors indicate that the indoor space is less than fully occupied; and
wherein the programmable logic controller further comprises fault detection for detection of a fan fault, heat/cool (temperature-based) fault, and energy consumption fault.

2. The EEC of claim 1 wherein the fault detection for the energy consumption fault further comprises a circuit logic that is configured to run whenever the EEC is operating and is set to: (a) to gather average outside air temperature, heat mode runtime, cool mode runtime, and ventilation mode runtime information at preset intervals to form sampled energy consumption amounts; (b) scan an internal database that comprises a time of day and outside air combination information in order to find a matching combination; and (c) compare sample energy consumption amounts against the internal database.

3. The EEC of claim 1 wherein the fan fault detection and heat/cool (temperature-based) fault detection are interconnected.

4. The EEC of claim 1 wherein the energy consumption fault is configured to be independent from the fan fault and heat/cool (temperature-based) fault and the energy consumption fault runs continuously while the EEC is in operation.

5. The EEC of claim 1 further comprising a central processor and an interconnection configured to network the programmable logic controller with one or more controllers.

6. The EEC of claim 5 wherein the interconnection is wireless.

* * * * *

UNITED STATES PATENT AND TRADEMARK OFFICE
CERTIFICATE OF CORRECTION

PATENT NO. : 10,480,806 B2  
APPLICATION NO. : 15/899916  
DATED : November 19, 2019  
INVENTOR(S) : Danny Miller et al.

It is certified that error appears in the above-identified patent and that said Letters Patent is hereby corrected as shown below:

On the Title Page

Column 1, Related U.S. Application Data, Line 1: Delete "(60)" and insert --(63)-- therefor In the Drawings Sheet 3 of 16, FIG. 3: Delete "CO2" and insert --$CO_2$-- therefor Sheet 4 of 16, FIG. 4: Delete "CO2" and insert --$CO_2$-- therefor Sheet 7 of 16, FIG. 7: Delete "CO2" and insert --$CO_2$-- therefor Sheet 8 of 16, FIG. 8: Delete "CO2" and insert --$CO_2$-- therefor Sheet 9 of 16, FIG. 9: Delete "CO2" and insert --$CO_2$-- therefor Sheet 14 of 16, FIG. 14: Delete "CO2" and insert --$CO_2$-- therefor Sheet 14 of 16, FIG. 14: Delete "CO2" and insert --$CO_2$-- therefor In the Specification Column 5, Summary of the Invention, Line 8: After "the", delete "¶"

Column 7, Detailed Description of the Invention, Line 13: After "prior", delete "¶"

Column 7, Detailed Description of the Invention, Line 32: Delete "[9.4]," and insert --[9.4].-- therefor Signed and Sealed this  
Fourteenth Day of April, 2020

Andrei Iancu  
*Director of the United States Patent and Trademark Office*

CERTIFICATE OF CORRECTION (continued)
U.S. Pat. No. 10,480,806 B2

In the Claims

Column 16, Line 4: In Claim 2, after "to:", insert --¶--

Column 16, Line 7: In Claim 2, after "amounts;", insert --¶--

Column 16, Line 9: In Claim 2, after "and", insert --¶--